United States Patent [19]

Tedesco et al.

[11] Patent Number: 4,820,585

[45] Date of Patent: Apr. 11, 1989

[54] ACRYLIC FIBERS HAVING IMPROVED DISPERSABILITY IN VISCOUS ORGANIC OR INORGANIC MATRICES

[75] Inventors: Raffaele Tedesco, Mestre; Socrate Bocus, Marghera; Luigi Signoretti, Mestre, all of Italy

[73] Assignee: Montefibre S.p.A., Milan, Italy

[21] Appl. No.: 8,172

[22] Filed: Jan. 29, 1987

[30] Foreign Application Priority Data

Jan. 31, 1986 [IT] Italy .............................. 19263 A/86

[51] Int. Cl.$^4$ ...................... B32B 13/02; D02J 11/00; D06M 15/05; D06M 15/263; D06M 15/333
[52] U.S. Cl. .................................... 428/360; 428/303; 428/338; 428/339; 428/361; 428/703
[58] Field of Search ............... 428/361, 373, 375, 327, 428/332, 357, 361, 360, 303, 703

[56] References Cited

U.S. PATENT DOCUMENTS

| | | | |
|---|---|---|---|
| 2,784,132 | 3/1957 | Maisel | 428/360 |
| 4,035,550 | 7/1977 | Suh et al. | 428/375 X |
| 4,224,377 | 9/1980 | Moens | 428/361 X |
| 4,515,636 | 5/1985 | Carney et al. | 428/375 X |
| 4,543,287 | 9/1985 | Briggs et al. | 428/375 X |
| 4,596,736 | 1/1986 | Eichhorn | 428/327 X |

FOREIGN PATENT DOCUMENTS 0116751 9/1981 Japan ................................. 428/361

*Primary Examiner*—James C. Cannon
*Attorney, Agent, or Firm*—Stevens, Davis, Miller & Mosher

[57] ABSTRACT

Agglomerates of acrylic fibers with improved dispersability in viscous organic or inorganic matrices constituted by at least 10 fibers bonded to each other, and wherein each fiber has a diameter shorter than 50 microns and a length higher than 3 mm.

4 Claims, No Drawings

ACRYLIC FIBERS HAVING IMPROVED DISPERSABILITY IN VISCOUS ORGANIC OR INORGANIC MATRICES

DESCRIPTION OF THE INVENTION

The present invention relates to acrylic fibers endowed with improved dispersability in viscous organic or inorganic matrices.

More particularly, the present invention relates to acrylic fibers showing better dispersability in mortars, concretes, plasters, thermosetting resins, and so forth.

It is known to use high tenacity and high elastic modulus acrylic fibers as a reinforcement for such inorganic matrices as cement, plaster, mortar, concrete, and such organic matrices as thermoplastic, thermosetting polymeric matrices, etc.

However, when these fibers are used in a length greater than 2 mm, considerable problems occur in respect of homnogeneity and of dispersability in the matrix to be reinforced, such that the addition has to be limited to very low values, generally lower than 3% by weight. Reinforced matrices containing such amounts of acrylic fibers have however unsatisfactory mechanical properties, especially in the case of organic matrices.

Such a drawback is due to the fact that the acrylic fibers, differently from those of glass, have a high value of elongation at break, generally of the order of 8%–15%; thus, during the admixing, they bend easily, without breaking, originating very bulky "tangles", which prevent a good penetration and dispersion in the material forming the matrix. Discontinuous areas are thus formed, which render the resulting composite material fragile or easily deformable.

In the case of high elongation fibers, this drawback could be overcome by using fibers having high flexural strength, so to prevent them from so positioning themselves as to form "tangles". A way to obtain a high flexural strength is that of using high diameter fibers, so to obtain a low length-to-diameter ratio. But the high-diameter fibers have low rigidity at break and, with the weight being the same, a lower surface for hooking or attaching to the matrix. Thus, the reinforced materials obtained with such fibers do not have the required mechanical properties.

It has now been found in accordance with the present invention that the small diameter acrylic fibers, with diameter lower than 50 microns and length higher than 3 mm, may advantageously be used as a reinforcement for viscous organic or inorganic matrices, without the above reported drawbacks occurring and, in particular, without the "tangling" phenomenon occurring, only if these fibers are used in the form of agglomerates constituted by a number of fibers varying as a function of the length and of the diameter of each fiber.

In particular, the best dispersability, homogeneity, and flexural resistance are obtained by using agglomerates containing a number of acrylic fibers equal to or greater than:

$$\left(\frac{L}{D.50}\right)^2 \quad (1)$$

wherein L is the length of the fibers and D is the diameter of the fibers, both in millimeters.

By applying the relationship (1) to acrylic fibers having diameters within the range of from 10 to 50 microns and a length within the range of from 1 to 60 mm, the following representative values are obtained for the preferred number of fibers in each agglomerate:

| Length, mm | Number of fibers having diameter (microns) | | | |
|---|---|---|---|---|
| | 10 | 20 | 40 | 50 |
| 2 | 15 | 5 | 1 | 1 |
| 3 | 35 | 10 | 2 | 1 |
| 6 | 150 | 35 | 10 | 6 |
| 12 | 600 | 150 | 35 | 25 |
| 24 | 1,500 | 600 | 150 | 100 |
| 48 | 10,000 | 2,500 | 600 | 400 |
| 60 | 15,000 | 4,000 | 1,000 | 600 |

It is evident from the above table that the use of agglomerates having a larger number of fibers is particularly required when the fibers are very thin, as of the order of from 10 to 20 microns; and vice-versa, when the fibers have a diameter of 50 microns and more, they may also be used individually. In the practice of this invention, it is preferred that each agglomerate shall contain a number of fibers greater than 10.

The fibers having a small diameter, generally lower than 50 microns, are particularly preferred as reinforcement, in that they are endowed with higher specific values of ultimate tensile strength and of elastic modulus; and moreover they have a greater surface area, per unit weight, which interacts with the material to be reinforced. Even if the longer fibers are recommended for the purpose of conferring a higher strength on the composite manufactured items, in practice, in case of matching the fibers to viscous matrices, it is preferred that such length be shorter than 60 mm in order to obtain more nearly homogeneous matrices.

By the term "acrylic fibers", as used in the instant specification and in the appended claims, those fibers are understood which are obtained by the wet-spinning or dry-spinning of homopolymers of acrylonitrile, of copolymers containing at least 50% by weight of acrylonitrile, the residue being an ethylenically unsaturated comonomer copolymerizable with acrylonitrile, or blends of polymers wherein the total content of polymerized acrylonitrile is higher than 70% by weight.

The agglomerates of the present invention are used in blends with mortars, concretes, cements, plasters, paints, sealants, putties, plastic materials, rubbers, etc., for the purpose of conferring on them both esthetic, thixotropci, anti-shrinkage properties, etc., as well as properties of strength with respect to mechanical stresses. For this latter property, it is preferred that the fibers shall have a tenacity higher than 50 cN/tex, an initial modulus higher than 1000 cN/tex, and an elongation-at-break not higher than 15%. These fibers are well known per se, and are marketed by the assignee.

For the preparation of the agglomerates used in the present invention, any per se known cohesion agent may be used. The cohesion-conferring agent is used as a function of the use the agglomerate is intended for, so to be soluble, to swell or to melt in the matrix to be reinforced, thus disengaging the fibers from each other after the step of admixing same with the matrix.

In case the agglomerates are to be used to reinforce such inorganic matrices as mortars, concretes, plasters, and so forth, the cohesion-conferring agent is selected from agents soluble or swelling in water or in an alkaline solution of the said matrices. In case, on the contrary, the agglomeraes are to be used to reinforce such thermosetting matrices as polyester, epoxy or polyurethane resins, etc., the cohesion-conferring agent is preferably of the type soluble in such organic solvents as ethylene glycol, styrene, toluene, etc.

Examples of agents soluble or swelling in water which may be used for the purpose of preparing the agglomerates used in the present invention are: carboxy-methyl-cellulose; polyvinyl alcohol; polyacrylic or polymethacrylic acids; polyvinyl acetate with medium or high degree of hydrolysis; acrylic and/or methacrylic copolymers sioluble or emulsifiable in water; copolymers containing an alkyl-acrylate, an alkyl-methacrylate and an unsaturated carboxy acid, urea-formaldehyde resins, etc.

Examples of cohesion-conferring agents soluble in organic solvents are polyurethane resins, polyester resins, epoxy resins, and so forth.

The amount of cohesion-conferring agent to be employed depends on the diameter of the fibers, on their length, on the number of fibers which are to be bonded, on the type of cohension-conferring agent used, as well as on the fiber-chopping process also. Generally, such amount is within the range from 1 to 30%, and preferaly within the range of from 2 to 10% by weight relative to the fiber.

The cohesion-conferring agent may be applied to the fibers as a continuous process, i.e., during the process of production of those same fibers, or batchwise, i.e., to the already-formed fibers.

According to the continuous process, the fibers exiting the coagulation bath, in the case of wet-spinning, after a one- or more-step stretching and drying and collapsing treatment, are dipped into an aqueous solution or dispersion of the cohesion-conferring agent. The fiber bundle is then wrung and the residual water is removed by heat treatment. The bonded and dried fibers so obtained are chopped, either in line or in a subsequent step, by any per se known chopping machine, to the desired length.

In the batchwise process, the fibers, in the form of a continuous low, either arranged on cars or as bobbins, are plunged into the aqueous solution or dispersion containing the cohesion-conferring agent, and are then dried and chopped.

According to a preferred embodiment of the present invention, agglomerates of acrylic fibers may be obtained by the following sequence of steps: extrusion of the polymer through a die, coagulation of the filaments exiting the die, washing and wet-stretching, drying, collapsing at 150°-200° C., further stretching of the filaments in the plastic state, up to a total stretch ratio of at least 8, cooling down of the filaments under hindered-shrinking conditions, passage of the filaments through an aqueous solution or dispersion of a cohesion-conferring agent, wringing of the filaments through rollers, so as to have a fiber/solution ratio of about 2, drying at 120°-150° C., and finally cooling down of the agglomerated filaments on rollers at 50°-60° C. The agglomerated filaments may be forwarded continuously to a guillotine chopping machine or to a wheel chopping machine, or they may be collected on cars and submitted to chopping in a separate step.

The degree of bonding of the various filaments to each other must be such as to withstand the chopping and carriage step, as well as a subsequent sacking or packaging step.

For the purpose of still better understanding the present invention, and of practically embodying the same, hereafter some illustrative but non-limitative examples are given.

EXAMPLE

An acrylonitrile homopolymer, having a specific viscosity of 0.340 (as measured at 25° C. with a solution containing 0.1 g of polymer in 100 ml of dimethylformamide) and a granulometric distribution of 85% under 100 microns, and with the residual 15% being within the range of from 100 to 150 microns, was so milled as to obtain a total granulometric distribution under 100 microns. The ground or milled polymer was dispersed in dimethylacetamide, at the temperaure of 30° C., so to form a 14% solids homogeneous dispersion, and was dissolved, at 150° C., by being passed through a heat exchanger.

The homogeneous solution so obtained was cooled to a temperaure of about 100° C., filtered and sent to and through a 500-bore die, each bore having a diameter of 52 microns, at a flow rate of 33.3 ml/minute. The filaments were coagulated in a solution of 50% by weight of dimethylacetamide and 50% of water, kept at the temperature of 30° C., and collected by a pair of rollers at the speed of 2.3 m/minute, with a stretch ratio $V_1/V_o = 0.083$, wherein $V_1$ is the rollers peripheral speed, and $V_o$ is the theoretical extrusion speed.

The filaments so obtained were washed with water, and then contemporaneously stretched in four successive stretching steps, to confer a total draft ratio of 7.5, with the following modalities and under the following operating conditions:

|  | Temperature | Stretch Ratio | Solvent Content |
| --- | --- | --- | --- |
| 1st Step | 60° C. | 1.2 | 20% |
| 2nd Step | 70° C. | 1.2 | 10% |
| 3rd Step | 85° C. | 1.3 | 3% |
| 4th Step | 98° C. | 4.01 | 0.1% |

The stretched filaments, after finishing, were dried on rollers heated at 190° C. and dry-stretched in three steps, with a total stretch ratio of 2.1, under the following conditions:

| Step | Stretch Ratio | Temperature |
| --- | --- | --- |
| 1st Step | 1.6 | 190° C. |
| 2nd Step | 1.2 | 170° C. |
| 3rd Step | 1.1 | 160° C. |

The filaments, cooled down to room temperature, and collected on a bobbin, had the following characteristics:

| Count: | 2.5 dtex |
| --- | --- |
| Tenacity: | 70 cN/dtex |
| Elongation: | 8.7% |
| Modulus: | 2000 cN/dtex |

The filaments were passed through an aqueous solution containing, as the cohesion-conferring agent, a derivative of polyvinyl alcohol marketed by Hoechst under the tradename AFILAN PS. The filaments exiting the aqueous solution were then wrung between two rollers; the concentration of the solution, and the amount of liquid conveyed by the fiber were such as to provide variable amounts of cohesion-conferring agent as a function of the chopping length, as reported in the following table:

| Chopping Length, mm | Amount of Applied AFILAN PS, % by weight |
|---|---|
| 6 | 1.5 |
| 20 | 4 |
| 30 | 5 |
| 48 | 7 |

The filaments were dried at 130°–140° C.
To a mixer:
1.5 liters of water
2.5 kg of Portland 525 cement; and
2.5 kg of sand of the finishing type, with a granulometry of 500 microns, were charged.

The mixture was kneaded for about 1 minute at high speed, so to render it homogeneous and clot-free. At the end of this operation, 100 g of high-modulus polyacrylonitrile fibers, obtained as described above were slowly added, over a period of 30–45 minutes, with stirring at a low rate. After the addition of the fibers, the stirring was continued for a further 30–60 seconds, always at low speed. At the end, the blend was poured into molds having dimensions of 20 cm×30 cm and 1.5 cm in height.

The so-obtained slabs were aged for 7 days in a room at 90% relative humidity and at 20° C., and for a further 21 days under room conditions.

The slabs were cut into strips of 20 cm×2.5 cm of surface area, which were used for the measurement of the flexural strength at breakage on an INSTRON stress-strain meter. The equipment was provided with a fitting for flexural breakage, equipped with two support rollers of ⅜ of an inch (=9.5 mm) in diameter, positioned with their axes spaced apart by 152.4 mm. The third roller, of reaction to the load, had the same diameter of ⅜ of an inch, and was located in a central position relatively to the first two rollers. The deformation speed used was 0.5 mm/minute.

With such procedures as described above, two samples of strips (A and B) were prepared. For the first sample (A), the polyacrylonitrile fibers as above described, but not treated with the aqueous solution of the cohesion-conferring agent, and having separated individual filaments, and a length of 12 mm, were used.

For the second sample (B), the same polyacrylonitrile fibers were used, but after having been treated with the aqueous solution of the adhesion-conferring agent AFILAN PS. These fibers have the form of agglomerates, each constituted by about 300 fibers having a length of 12 mm. The content of cohesion-conferring agent is about 3% by weight.

The values of the flexural strength at breakage were:
Sample A=50 kg/cm$^2$
Sample B=80 kg/cm$^2$.

By observing the fracture sections of these samples, it was found that in Sample A the fibers were distributed in a now homogeneous and isles-forming pattern, with the presence of bundles of fibers not "wetted" by the matrix. In Sample B, on the contrary, the fibers were distributed in a uniform pattern throughout the matrix, and were completely "wetted" by the same matrix.

What is claimed is:

1. Agglomerates of fibers having improved dispersability in viscous inorganic matrices, constituted by staple acrylic fibers based on homopolymers or copolymers of acrylonitrile containing at least 50% by weight of acrylonitrile, and having a tenacity higher than 50 cN/tex, an initial modulus higher than 1000 cN/tex, and an elongation at break not higher than 15%, each fiber having a diameter less than 50 microns and a length greater than 3 mm and less than 60 mm, bonded to each other by a cohesion conferring-agent soluble or swellable in water or in an alkaline aqueous solution, said cohesion conferring-agent being employed in an amount within the range of from 1.5 to 7% by weight relative to the fibers, said fibers being obtained by: extrusion of the polymer through a die; coagulation of the filaments exiting the die; washing and wet-drafting, drying, collapsing at 150°–200° C.; further drafting of the filaments in the plastic state, up to a total draft ratio of at least 8; cooling down of the filaments under hindered retraction conditions; the number of acrylic fibers for each agglomerate being equal to or greater than $$\left(\frac{L}{D50}\right)^2$$

wherein L is the length of the fibers and D is the diameter of the fibers, both in millimeters.

2. Agglomerates of fibers according to claim 1, wherein each agglomerate has a number of acrylic fibers greater than 10.

3. Agglomerates of fibers according to claim 1, wherein the cohesion-conferring agent is applied in an amount comprised within the range of from 2 to 10% by weight relative to the fiber.

4. Agglomerates of fibers according to claim 1, wherein each acrylic fiber has a length shorter than 60 mm.

* * * * *